United States Patent Office 3,388,203
Patented June 11, 1968

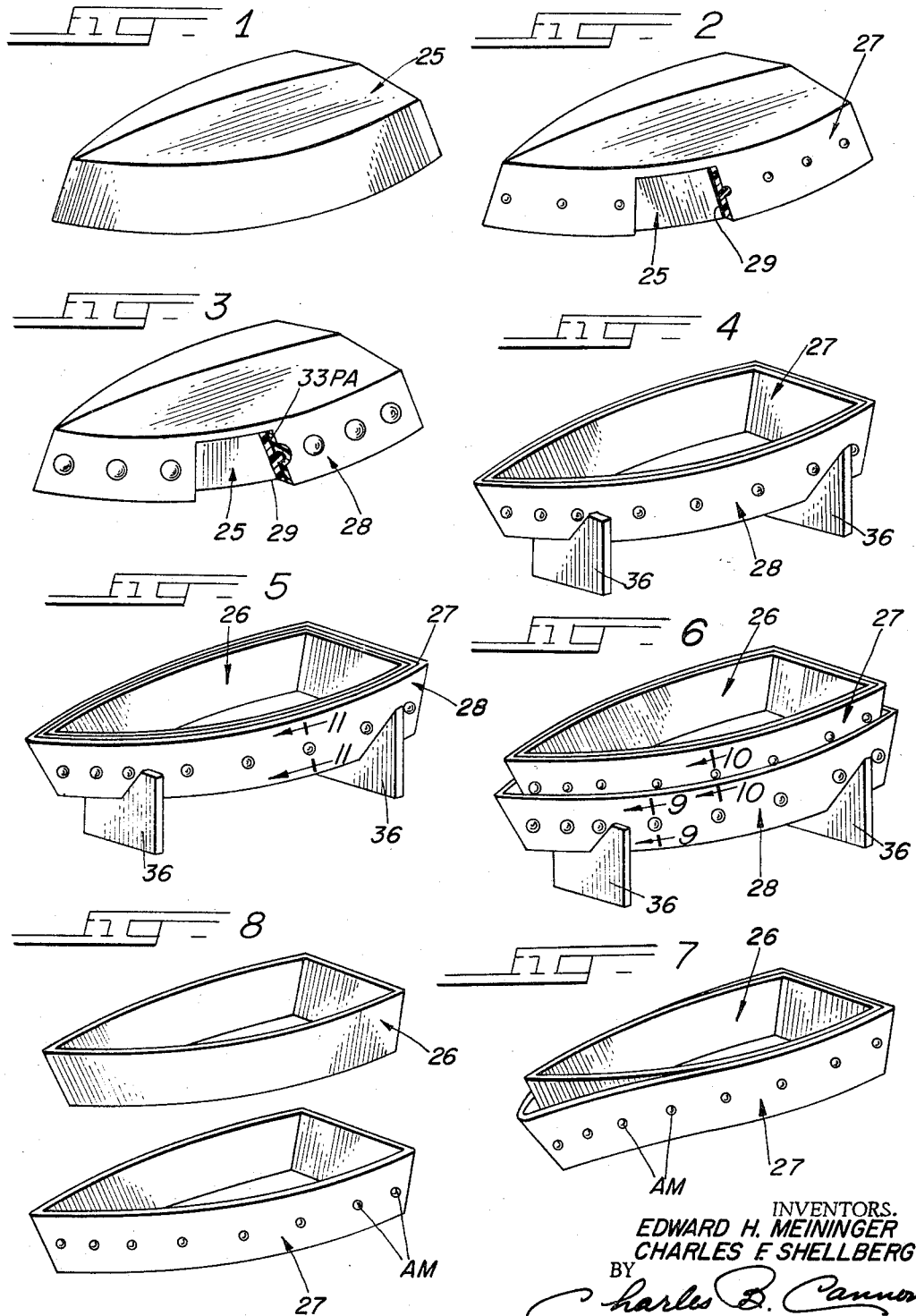

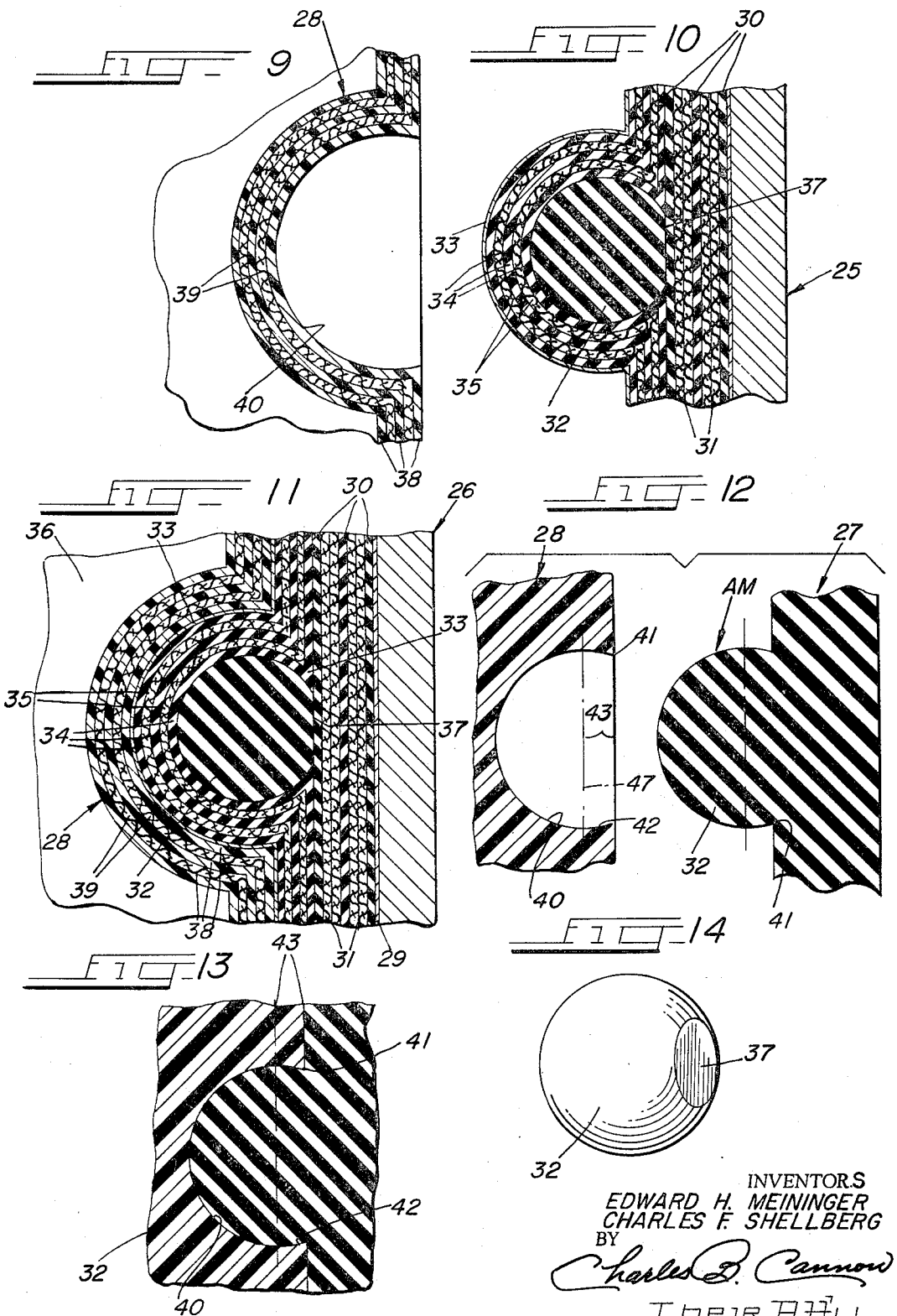

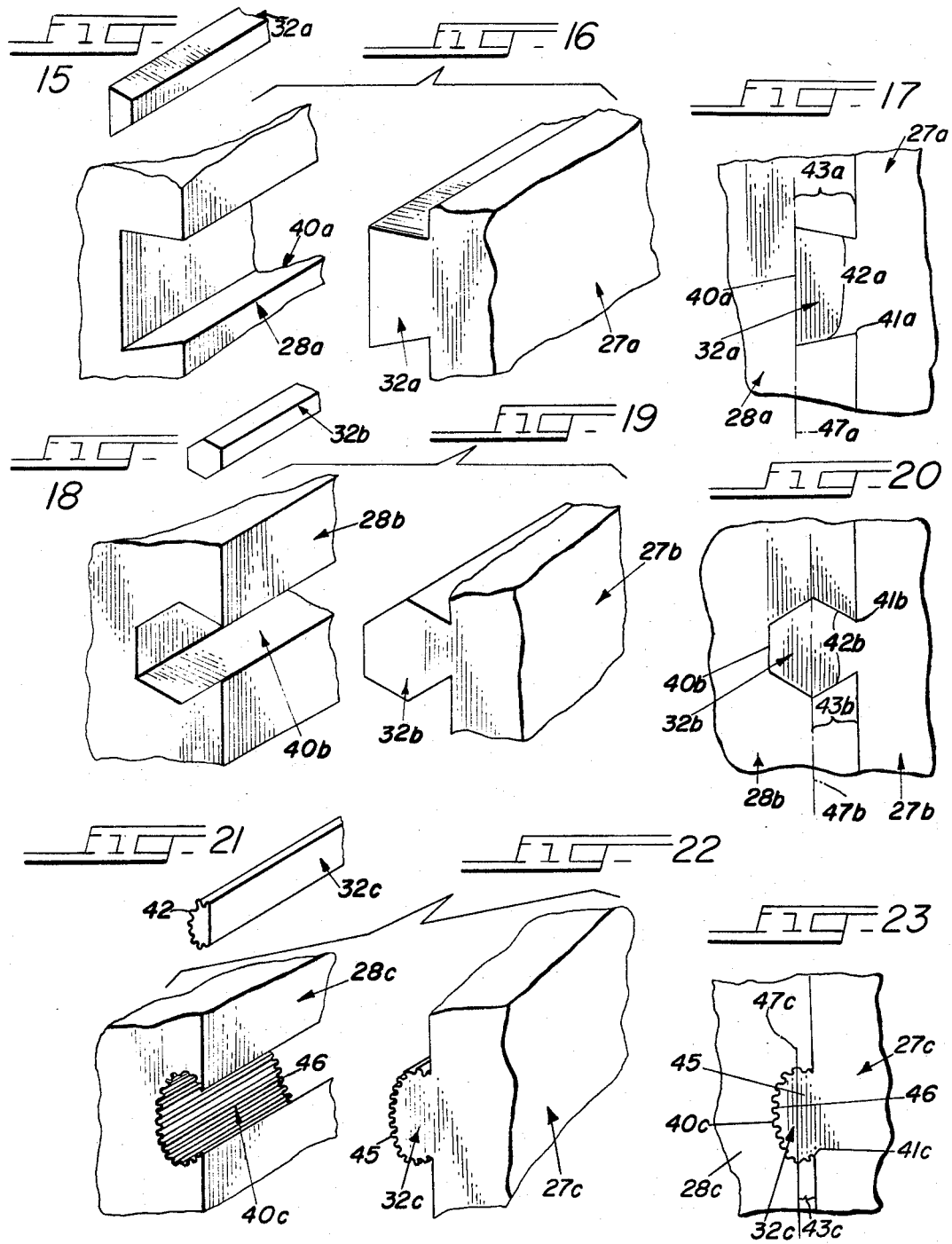

3,388,203
METHOD FOR MOLDING ARTICLES FROM PLASTIC RESINOUS MATERIALS
Edward H. Meininger and Charles F. Shellberg, Racine, Wis., assignors of five percent to John W. Foley, Racine, Wis.
Filed Feb. 9, 1965, Ser. No. 431,264
11 Claims. (Cl. 264—225)

ABSTRACT OF THE DISCLOSURE

A method is provided for molding relatively large and heavy articles such, for example, as small boats, automobile bodies, and the like, from suitable molding materials, such as reinforced synthetic plastic resinous molding materials. The method overcomes a problem experienced in the prior art in attempting to mold such relatively heavy articles and which resides in the fact that in the prior art methods the vertical walls of the mold and of the article or object formed thereon tend to sag under their own weight during the molding operation, and as the weight on the flexible mold increases, with the result that the molded article or object, and particularly the vertical wall surfaces thereof, are improperly and imperfectly formed. In the practice of the new method flexible, resilient and compressible anchoring members are adhesively attached to the flexible mold and are compressed during the molding operation to form pockets in a rigid backing shell which is formed over the outer surface of the flexible mold. These pockets receive the flexible, resilient, compressible anchoring members and thereby firmly anchor the flexible mold and the rigid backing shell together during the molding operation and thus prevent sagging of the vertical and other wall areas of the flexible mold during the molding operation, so that the flexible mold retains the true form of the patterns on which it was made. After the molding operation has been completed the flexible mold and the flexible resilient, compressible anchoring members attached thereto, and the molded article or object, are withdrawn from the relatively rigid backing shell, whereupon the flexible, resilient compressible anchoring members are withdrawn from the recesses or pockets in the rigid backing shell and the molded article or object is separated from the flexible mold.

---

This invention relates to a method and apparatus for molding articles and particularly relatively large and heavy objects such as boats, automobile bodies, and the like, from suitable molding materials such, for example, as reinforced synthetic plastic resinous molding materials, and to a flexible mold for use in forming such articles.

One of the problems involved in the molding of relatively large and heavy objects such, for example, as boats, automobile bodies, and the like, from molding materials, including synthetic plastic resinous molding materials, such, for example, as woven glass fabric or cloth impregnated with polyester molding resin, is the fact that molding methods heretofore employed in forming relatively small objects of such synthetic plastic resinous molding materials do not work satisfactorily in molding relatively larger and heavier objects. One of the reasons for this is the fact that the vertical walls of the flexible molds employed in the forming of such relatively larger and heavier objects tend to sag under their own weight, and under the weight of the resinous molding materials applied thereto during the molding operation, particularly in the vertical wall areas of the flexible mold, with the result that the object molded therefrom is improperly and imperfectly formed and molded.

An object of the present invention is, therefore, to provide a new and improved method of molding relatively large and heavy objects of molding materials, such as reinforced synthetic plastic resinous molding materials, employing a flexible mold, and in which the aforesaid and other problems heretofore experienced in the art are overcome.

More specifically an object of the present invention is to provide a new and improved method of molding relatively large and heavy objects of molding materials, in which the vertically extending wall surfaces or areas of the flexible mold employed are prevented from sagging during the molding operation, and are retained in their proper position at all times so that the object to be molded therefrom is properly shaped, formed and molded.

An additional object of the invention is to provide a novel method of retaining the flexible mold, which is employed in the new molding method, in proper operative relation to a relatively rigid holding or backing shell disposed thereabout so as to prevent the vertical walls of the flexible mold from sagging during the molding operation.

A further object of the invention is to provide a new and improved method of molding relatively large and heavy objects from molding resins and which includes a novel method of anchoring the vertically extending walls of the flexible mold to a surrounding relatively rigid holding or backing shell during the molding operation so as to prevent sagging of the vertical walls of the flexible mold during the molding operation and thereby prevent malformation of the object to be formed from and upon the flexible mold.

An additional object of the present invention is to provide a new and improved apparatus for use in molding relatively large and heavy objects such, for example, as boats, automobile bodies, and the like, from molding materials such as woven glass fabric reinforced molding resins.

Other objects will appear hereinafter.

In the drawings:

FIG. 1 is a perspective view of a pattern used in the practice of the present invention;

FIG. 2 is a perspective view of the pattern shown in FIG. 1 and showing the completed flexible mold formed thereon with a part thereof broken away to reveal the pattern and the completed flexible mold formed and showing a parting agent disposed between the pattern and the flexible mold;

FIG. 3 is a perspective view similar to FIG. 2 but showing the rigid backing shell formed over the completed flexible mold;

FIG. 4 is a perspective view showing the completed flexible mold and the rigid backing shell inverted and rested upon suitable supports and with the pattern removed;

FIG. 5 is a perspective view showing the assembled flexible mold and the rigid backing shell with an object molded within the flexible mold;

FIG. 6 is a perspective view similar to FIG. 5 but showing the assembled flexible mold and the molded object molded thereon being removed from the rigid backing shell;

FIG. 7 is a perspective view showing the assembled flexible mold and the molded object in assembled position but removed from the rigid backing shell;

FIG. 8 is an exploded perspective view showing the molded object peeled from the flexible mold;

FIG. 9 is an enlarged vertical sectional detail view, on line 9—9 in FIG. 6, showing in detail the construction of the rigid backing shell;

FIG. 10 is an enlarged sectional view on line 10—10 in FIG. 6 showing the construction of the flexible mold;

FIG. 11 is an enlarged sectional view on line 11—11 in FIG. 5 showing the construction of the assembled flexible mold, rigid backing shell, and the molded object molded in the flexible mold;

FIG. 12 is an exploded schematic view showing the construction of one form of anchoring means embodied in the present invention for anchoring the flexible mold to the rigid backing shell;

FIG. 13 is a schematic view, similar to FIG. 12, but showing the anchoring means in assembled position;

FIG. 14 is a perspective view of one of the anchoring units embodied in the anchoring means as shown in FIGS. 10 and 11;

FIG. 15 is a perspective view of another form of one of the anchoring members;

FIG. 16 is an exploded perspective view of another form of the anchoring means for anchoring the flexible mold to the rigid backing shell and embodying the anchoring member illustrated in FIG. 15;

FIG. 17 is a view of the parts shown in FIG. 16 in assembled position;

FIG. 18 is a perspective view of another form of one of the anchoring members;

FIG. 19 is an exploded perspective view of another form of anchoring means for anchoring the flexible mold to the rigid backing shell and embodying the anchoring member shown in FIG. 18;

FIG. 20 is a view similar to FIG. 19 but showing the parts in assembled position;

FIG. 21 is a perspective view of another form of one of the anchoring members;

FIG. 22 is an exploded perspective view of another form of anchoring means for anchoring the flexible mold to the rigid backing shell employing the anchoring member illustrated in FIG. 21; and FIG. 23 is a view showing the anchoring means illustrated in FIG. 22 in assembled position.

In the practice of the present invention a pattern 25 is formed of any suitable material such, for example, as wood, cut, shaped, sized and formed to the pattern of the object which is to be molded, such as a boat, automobile body, or the like, and is shown as having the form of a boat 26.

The new flexible mold is generally indicated at 27 in the drawings and a rigid backing shell therefor which is employed in the practice of the present invention is generally indicated at 28 in the drawings.

The first step in the making of the new flexible mold 27, according to the new molding method, is the application of a coating of a suitable parting agent 29 to the exterior surface of the pattern 25. This step is followed by forming the flexible mold 27 and this is accomplished by applying over the coating of parting agent 29 multiple and successively applied coatings 30 of flexible mold-forming material such, for example, as natural rubber latex or any suitable synthetic copolymer elastomer or so-called synthetic rubber such, for example, as butadiene-acrylonitrile copolymer elastomers, and the like. A typical form of such flexible mold-forming material is a natural latex, known as No. 2016–H (Milligan Adhesive Company). The body of the flexible mold 27 is completed by applying over each latex coating 30 a layer of reinforcing material in the form of a layer of woven glass fabric or cloth 31 which is impregnated with the latex applied thereover and by the latex applied therebelow. Such woven glass cloth or fabric material may be of any suitable type such, for example, as Owens-Corning Fiberglas glass fabric.

The next step in the practice of the new molding operation is the application of so-called anchoring means (FIGS. 10–14) to the vertically extending wall surfaces of the inner body portion of the flexible mold 27 so that when completed the flexible mold 27 will be firmly anchored to the outer end relatively rigid backing shell 28, as will be described more fully hereinafter. This anchoring step is accomplished by applying flexible, resilient and compressible anchoring members, of suitable geometric design and shape, such as the solid but flexible, resilient, compressible and generally spherical rubber anchoring members 32, at suitable spaced intervals upon and around the vertically extending wall surfaces or areas of the outermost coating 30 of flexible mold-forming latex material in the inner body of the flexible mold 27. The function and purpose of these solid but flexible, resilient and compressible anchoring members 32 will be described more fully hereinafter.

The next step in the practice of the present invention resides in adhesively attaching over the outermost coating of latex 30, in the flexible mold 27, and while the said outermost coating of latex is still moist and liquid, flexible, resilient and compressible anchoring members 32 which are arranged at pre-selected spaced intervals upon and over the vertically extending outer wall surfaces of the flexible mold 27. The anchoring members 32 are then covered by multiple and successively applied coatings of latex 34 and layers of glass cloth 35 (FIG. 10).

The rigid backing shell 28 is then formed over the completed flexible mold 27 and over the flexible, resilient and compressible anchoring members 32 and the initial step in this operation consists in first applying a coating of a parting agent 33 (FIGS. 3 and 10) over the exterior surface of the completed flexible mold 27, and over the outer surfaces of the completed flexible, resilient and compressible anchoring members 32 and the latex and glass cloth layers 34–35 thereon (FIG. 10), other than the inner surface 37 thereof, which will be referred to further hereinafter, and then applying multiple and successive coatings 38 of resinous molding material such, for example, as polyester resin, over the parting agent coating 33. Such resinous coatings 38 may be applied by spray coating, brush-up coating, or otherwise. Successive layers of reinforcing material in the form of woven glass fabric or cloth 39 such, for example, as Owens-Corning Fiberglas glass fabric, are then applied alternatively over each of the resinous coatings, and this operation of applying successive coatings of molding resin 38 and reinforcing glass fabric or cloth 39 may be repeated as many times as desired, depending upon the strength and thickness desired in the rigid backing shell 28. Each coating of resinous material 38 is allowed to dry at room temperature before the next succeeding coating is applied thereover. During this operation the layers of woven glass fabric or cloth 39 become impregnated with and are reinforced by the molding resin coatings 38.

In this manner, the rigid backing shell 28 is completed and the flexible, resilient and compressible hemispherical anchoring members 32 are anchored to the flexible mold 27 and to the relatively rigid backing shell 28, and the flexible resilient anchoring member 32 are placed under compression, as will be described more fully hereinafter.

In the practice of the present invention, the flexible mold 27 and the rigid backing shell 28 anchored thereto are then inverted and placed upon suitable supporting means 36 (FIGS. 4, 5, 6 and 11) whereupon the molded unit 26, which is shown as having the form of a small boat 26, is then formed upon and within the interior surface of the flexible mold 27, by applying over the inner surface of the flexible mold 27 repeated multiple coatings of resinous mold-forming material, in the form of polyester or like molding resins, as hereinbefore referred to, with alternate layers of reinforcing woven glass fabric applied thereto, each successively applied resinous coating being allowed to dry or set at room temperature before the next succeeding coating of resinous molding material and reinforcing woven glass fabric are applied thereto.

In this manner, the molded object 26 is completed and when dried or set the flexible mold 27 and the molded object 26 may be removed from the rigid backing shell 28, whereupon the completed molded object 26 may be removed from the flexible mold 27 (FIGS. 7 and 8).

In order to create the necessary holding power to anchor the vertically extending walls of the flexible mold 27 to the vertically extending walls of the relatively rigid backing shell 28 the anchoring members 32 are preferably made of natural rubber latex or like flexible, resilient and compressible but solid material, such as natural rubber latex or synthetic copolymer elastomers such, for example, as a butadiene-acrylonitrile copolymer elastomer, and they may be made of generally spherical form, as shown in FIGS. 10–14, or in other geometrical forms, as shown in FIGS. 15–23.

In the practice of the present invention the flexible anchoring means, in the form of the flexible, resilient and compressible rubber latex anchoring members 32, are preferably formed with a cut-out portion providing a relatively flat surface 37 (FIGS. 10, 11 and 14) and they are so formed, sized and shaped that when the flat surfaces 37 thereof are adhesively applied to the flexible mold 27, by means of the outermost coating of latex 30 in the flexible mold 27, or by means of additional adhesive, as desired, the flexible, resilient and compressible anchoring members 32 assume the position in which one of the same is shown in FIG. 10; the anchoring members 32 being covered with multiple coatings of latex 34 and woven glass fabric or cloth 35, as shown in FIG. 10. The flexible, resilient and compressible anchoring members are compressed from the position or form in which they are shown in FIG. 10 into the position or form in which they are shown schematically in FIGS. 12 and 13, thereby forming recesses or pockets 40 in the body of the rigid backing shell 28 in which the flexible, resilient anchoring members 32 are arranged in close fitting relationship and in which they are anchored under compression; each of the flexible, resilient and compressible anchoring members 32 being of the same general size, shape and dimensions as the pocket 40 in which it is arranged. Each of these recesses or pockets 40 has a closed inner end portion and has a mouth or inlet 41 (FIGS. 12 and 13) which faces the body of the flexible mold 27, and a throat portion 42 which is formed in each pocket or recess 40 inwardly of the mouth or inlet portion 41 thereto. As shown in FIGS. 12 and 13 the mouth 41 of each pocket or recess 40 is of smaller diameter than the throat portion 42 of the pocket or recess 40, and is of smaller diameter than the body of the corresponding flexible, resilient anchoring member 32, thereby providing a so-called back draft or holding area 43 by which each of the flexible resilient anchoring members 32 is anchored in the corresponding pocket 40 and by which it is prevented from being withdrawn out of the corresponding anchoring recess or pocket 40 in the relatively rigid backing shell 28; the back draft or holding area 43 being defined by that area of the pocket 40 which is disposed between the mouth 41 thereof and the line 47 which extends across the interior of the pocket 40 inwardly of the mouth or inlet 41 thereof. In this manner, the flexible mold 27 is thus securely anchored to the relatively rigid backing shell 28 and the vertically extending wall surfaces of the flexible mold 27 are prevented from sagging under the weight of the flexible mold 27 and the rigid backing shell 28 formed thereon.

Moreover, in this manner the flexible mold 27 thus formed is thereby maintained in uniform shape corresponding to the shape of the pattern 25 on which it has been formed and any irregularities which would otherwise occur due to sagging of the vertical wall surfaces of the flexible mold 27, as the weight thereof increases during formation of the flexible mold 27, are eliminated thereby overcoming a problem heretofore experienced in the art.

A modified form of the new flexible, resilient anchoring means 32 is illustrated in FIGS. 15, 16 and 17 of the drawings and those parts thereof which are comparable to or correspond to parts of the invention illustrated in FIGS. 1 to 14, inclusive, have been given the same reference numerals followed by the additional and distinguishing reference character $a$.

Thus, in the form of the invention illustrated in FIGS. 15, 16 and 17 the flexible, resilient and compressible anchoring means is shown as having the general form of a mortise and tenon joint embodying a tongue portion 32$a$ which is adhesively attached to the body of the flexible mold 27$a$. The anchoring means in the form of the tongue portion 32$a$ is then covered with alternate coatings of latex and woven glass cloth or fabric. This tongue portion 32$a$ projects into a correspondingly shaped recess or pocket 40$a$ in the form of an elongated groove formed in the body of the rigid backing shell 28$a$ with the result that a so-called back draft or holding area 43$a$, defined by the side wall surfaces 42$a$ of the pocket or groove 40$a$, inwardly of the mouth or inlet 41$a$ thereof, is thus provided, as shown in FIG. 17. This arrangement prevents the backing out or withdrawal of the tongue-shaped flexible, resilient anchoring member 32$a$ from the corresponding pocket or groove 40$a$ in the relatively rigid backing shell 28$a$.

Another modification of the flexible, resilient and compressible anchoring member is shown in FIGS. 18, 19 and 20 of the drawings and those parts thereof which are similar to or comparable to corresponding parts of the invention illustrated in FIGS. 1 to 14, inclusive, have been given the same reference numerals followed by the additional and distinguishing reference character $b$.

Thus, in the form of the invention illustrated in FIGS. 18, 19 and 20 the flexible resilient and compressible anchoring means 32$b$ is in the form of a generally hexagonal shaped tongue member 32$b$ which is adhesively attached to the body of the flexible mold 27$b$ and fits into a correspondingly shaped pocket or recess in the form of a channel or groove 40$b$ in the body of the rigid backing shell 28$b$ with the result that the area 43$b$ defined by the side walls 42$b$ of the groove 40$b$, inwardly of the mouth 41$b$ thereof, (FIG. 20) provides a so-called back draft or holding area 43$b$ which prevents the flexible resilient and compressible anchoring member 32$b$ from being withdrawn from the correspondingly shaped pocket or recess 40$b$ in the body of the relatively rigid backing shell 28$b$.

The tongue-shaped anchoring member 32 is covered with alternate coatings of latex and woven glass cloth or fabric.

Another modification of the anchoring means embodied in the invention is illustrated in FIGS. 21, 22 and 23 of the drawings and those parts thereof which correspond to or are similar or comparable to corresponding parts of the invention illustrated in FIGS. 1 to 14, inclusive, have been given the same reference numerals followed by the additional and distinguishing reference character $c$.

Thus, in the form of the invention illustrated in FIGS. 21, 22 and 23 of the drawings the flexible resilient and compressible anchoring members 32$c$ are in the form of an elongated generally oval-shaped member 32$c$ which is adhesively attached to the flexible mold 27$c$ and fits into a correspondingly shaped pocket or recess in the form of an elongated groove 40$c$ in the body of the relatively rigid backing shell 28$c$; the anchoring member 32$c$ being covered with alternate coatings of latex and woven glass cloth or fabric. Each of the flexible, resilient and compressible anchoring members 32$c$ is provided with parallel longitudinally extending ribs or ridges 45 which correspond to correspondingly shaped longitudinally extending parallel auxiliary grooves 46, which are formed in the walls which define the main grooves 40$c$ of the relatively rigid backing shell 28$c$ with the result that a so-called back draft or holding area 43$c$ is provided, thus preventing the flexible, resilient anchoring member 32$c$ from being drawn out of the correspondingly shaped groove 38$c$ in the body of the relatively rigid backing shell 28$c$. In addition, any danger of such withdrawal of the flexible, resilient and compressible anchoring members 32$c$ from the pockets or grooves 40$c$ in the body of the relatively rigid backing shell 28$c$ is further prevented by the interlocking of the ribs or ridges 45 on the anchoring members 32c with the auxiliary grooves 46 formed in the walls of each of the main grooves 38c in the body of the relatively rigid backing shell 28c.

It will thus be noted that the present invention provides a new and improved method of molding relatively large and heavy objects of molding materials, such as synthetic plastic resinous molding materials, such, for example, as glass fiber impregnated with polyester resin, employing a flexible mold, and a relatively rigid backing shell therefor.

Hence, it will be seen that the present invention thus effectively prevents sagging of the vertical wall areas or surfaces of the flexible mold 27 during the molding operation and thus overcomes a serious problem heretofore experienced in the art and provides a novel method which enables perfectly shaped and formed relatively large and heavy objects to be properly and uniformly molded from synthetic plastic resinous molding materials, employing a flexible mold.

It will further be seen from the foregoing description, considered in conjunction with the accompanying drawings, that the present invention provides a new and improved method and apparatus for molding relatively large and heavy objects from synthetic plastic resinous molding materials employing a flexible mold, and a new and improved flexible mold made therefrom and that the invention thus has the desirable advantages and characteristics and accomplishes its intended objects including those hereinbefore pointed out and others which are inherent in the invention.

We claim:

1. A method of molding relatively large and heavy objects from flexible mold materials, employing a flexible mold having a shape and design of the object to be molded and including vertically extending inner and outer wall surfaces, which comprises the steps of:
    (a) providing a pattern of the object to be molded;
    (b) forming a flexible mold by successively applying over the said pattern successive coatings of flexible mold-forming material and layers of flexible reinforcing material;
    (c) adhesively attaching a plurality of flexible, resilient and compressible anchoring members to the said flexible mold thus formed at spaced intervals around and upon the said vertically extending outer wall surfaces thereof;
    (d) forming a relatively rigid backing shell over the said outer surfaces of the said flexible mold and over the said flexible, resilient and compressible anchoring members by successively applying coatings of resinous material and layers of reinforcing material over the said outer surface of the said flexible mold and over the said flexible, resilient and compressible anchoring members so that the said flexible, resilient and compressible anchoring members are placed under compression in pockets or recesses formed thereby in the body of the said relatively rigid backing shell;
    (e) molding the object to be molded by applying successive applications of molding material over the inner surface of the said flexible mold and allowing the said molding material to set or cure to form the molded object;
    (f) separating the said flexible mold and the said flexible resilient, and compressible anchoring members attached thereto and the said molded object molded thereon from the said relatively rigid backing shell by withdrawing the said flexible, resilient, compressible anchoring members from said pockets or recesses in the said relatively rigid backing shell; and
    (g) separating the said molded object from the said flexible mold.

2. The method defined in claim 1 in which the successive applications of molding material are in the form of successively applied coatings of resinous molding material and alternate layers of woven glass fabric reinforcing material.

3. The method defined in claim 1 in which each of the said pockets formed in the body of the said relatively rigid backing shell by the said flexible, resilient and compressible anchoring members has a closed inner end portion and a throat portion at its outer end facing the said flexible mold and of a predetermined diameter, and in which each of the said pockets has a mouth portion adjacent to but inwardly of the said throat portion and having a diameter smaller than that of the said throat portion, thereby providing a back draft or holding area in each of the said pockets adjacent to and inwardly of the said mouth portion thereof, and in which the outer surface of each of the said flexible resilient anchoring members corresponds in size and shape to the size and shape of said pocket in which it is arranged, whereby each of the said flexible, resilient anchoring members is prevented by the said back draft or holding area from being withdrawn out of the corresponding one of the said pockets through the said mouth portion thereof and said flexible mold is thereby firmly anchored to the said relatively rigid backing shell and the vertically extending wall surfaces of the said flexible mold are prevented from sagging during or as an incident to the molding operation.

4. The method defined in claim 3 in which each of the said pockets and each of the said flexible, resilient, and compressible anchoring members is generally spherical in form.

5. The method defined in claim 3 in which each of the said pockets is in the form of an elongated groove formed in the body of the relatively rigid backing shell and in which each of the said flexible, resilient and compressible anchoring members is in the form of an elongated tongue-like member fitting into the corresponding one of said pockets.

6. The method defined in claim 5 in which each of the said pockets is in the form of an elongated main groove formed in the body of the said relatively rigid backing shell, and in which each of the said grooves has a plurality of parallel longitudinally extending grooves formed therein on its inner wall surface, and in which each of the said flexible, resilient, compressible tongue-like anchoring members has a plurality of parallel longitudinally extending ribs or ridges formed thereon and fitting into and interlocked with the said auxiliary grooves in the corresponding one of said main grooves.

7. Apparatus for molding relatively large and heavy objects from flexible molding materials comprising
    (a) a flexible mold having the shape and design of the object to be molded and including vertically extending inner and outer wall surfaces;
    (b) a plurality of flexible, resilient and compressible anchoring members adhesively attached to the said flexible mold at spaced intervals around and upon the said vertically extending outer wall surfaces thereof;
    (c) a relatively rigid backing shell over the said outer wall surfaces of the said flexible mold and over the said flexible, resilient and compressible anchoring members;
    (d) the said flexible, resilient and compressible anchoring members being compressed between the said flexible mold and the said relatively rigid backing shell, and providing
    (e) pockets or recesses in the body of the said relatively rigid backing shell in which the said flexible, resilient and compressible anchoring members are arranged under compression.

8. Apparatus as defined in claim 7 in which each of the said pockets in the body of the said relatively rigid backing shell has
    (a) a closed inner end portion and a throat portion at its outer end facing the said flexible mold and of a predetermined diameter; each of the said pockets having (b) a mouth portion adjacent to but inwardly of the said throat portion and having (1) a diameter smaller than that of the said throat portion, thereby providing (c) a back draft or holding area in each of the said pockets adjacent to and inwardly of the said mouth mouth portion thereof, and in which the outer surface of each of the said flexible, resilient and compressible anchoring members corresponds in size and shape to the size and shape of the said pocket in which it is arranged, whereby each of the said flexible, resilient anchoring members is prevented by the said back draft or holding area from being withdrawn out of the corresponding one of the said pockets through the said mouth portion thereof and the said flexible mold is thereby firmly anchored to the said relatively rigid backing shell.

9. Apparatus as defined in claim 7 in which each of the said pockets and each of the said flexible, resilient, and compressible anchoring members is generally spherical in form.

10. Apparatus as defined in claim 7 in which each of the said pockets is in the form of an elongated groove formed in the body of the relatively rigid backing shell and in which each of the said flexible, resilient and compressible anchoring members is in the form of an elongated tongue-like member fiting into the corresponding one of said pockets.

11. Apparatus as defined in claim 7 in which each of the said pockets is in the form of an elongated main groove formed in the body of the said relatively rigid backing shell, and in which each of the said grooves has a plurality of parallel longitudinally extending grooves formed therein on its inner wall surface, and in which each of the said flexible, resilient, compressible tongue-like anchoring members has a plurality of parallel longitudinally extending ribs or ridges formed thereon and fitting into and interlocked with the said auxiliary grooves in the corresponding one of said main grooves.

No references cited.

ALEXANDER H. BRODMERKEL, *Primary Examiner.*

J. R. THURLOW, *Assistant Examiner.*